United States Patent
Noguchi

(10) Patent No.: US 9,121,735 B2
(45) Date of Patent: Sep. 1, 2015

(54) ENCODER, LENS APPARATUS, AND CAMERA CAPABLE OF DETECTING POSITION OF OBJECT

(71) Applicant: CANON KABUSHIKI KAISHA, Tokyo (JP)

(72) Inventor: Kazuhiro Noguchi, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 58 days.

(21) Appl. No.: 13/959,852

(22) Filed: Aug. 6, 2013

(65) Prior Publication Data
US 2014/0043526 A1 Feb. 13, 2014

(30) Foreign Application Priority Data
Aug. 8, 2012 (JP) .................. 2012-176385

(51) Int. Cl.
*G03B 13/00* (2006.01)
*G01D 5/347* (2006.01)
*H04N 5/225* (2006.01)

(52) U.S. Cl.
CPC .......... *G01D 5/3473* (2013.01); *G01D 5/34776* (2013.01); *G01D 5/34792* (2013.01)

(58) Field of Classification Search
USPC ............... 348/357; 359/823; 396/529, 532
See application file for complete search history.

(56) References Cited

U.S. PATENT DOCUMENTS

| | | | | |
|---|---|---|---|---|
| 4,703,176 A * | 10/1987 | Hahn et al. | ........ | 250/231.14 |
| 8,018,666 B2 * | 9/2011 | Kakuta | ........ | 359/824 |
| 8,565,591 B2 * | 10/2013 | Toyama et al. | ........ | 396/131 |
| 8,718,462 B2 * | 5/2014 | Voss | ........ | 396/287 |
| 8,736,987 B2 * | 5/2014 | Sugita | ........ | 359/822 |
| 8,830,604 B2 * | 9/2014 | Sato | ........ | 359/824 |
| 2012/0075622 A1 * | 3/2012 | Nagura | ........ | 356/138 |
| 2012/0328277 A1 * | 12/2012 | Nakata et al. | ........ | 396/131 |

FOREIGN PATENT DOCUMENTS

| | | | |
|---|---|---|---|
| JP | 07-120277 A | 5/1995 |
| JP | 2007-047652 A | 2/2007 |
| JP | 2009-169052 A | 7/2009 |
| JP | 2012-122771 A | 6/2012 |

* cited by examiner

Primary Examiner — Ngoc-Yen Vu
(74) Attorney, Agent, or Firm — Rossi, Kimms & McDowell LLP

(57) ABSTRACT

An encoder includes a base, a cylinder rotatable in a circumferential direction with respect to the base, at least three supporting portions rotatably supporting the cylinder with respect to the base, a connecting portion provided on the cylinder and rotatable within a first range between two supporting portions of the at least three supporting portions, a scale attached to the cylinder, and a detector configured to detect a position of the cylinder with respect to the base by using the scale, and the detector is arranged within a second range different from the first range.

8 Claims, 18 Drawing Sheets

ENCODER, LENS APPARATUS, AND CAMERA CAPABLE OF DETECTING POSITION OF OBJECT

BACKGROUND OF THE INVENTION

1. Field of the Invention

The present invention relates to an encoder that detects a position of an object.

2. Description of the Related Art

Previously, there is an optical apparatus such as a lens apparatus or a camera that has an autofocus (AF) function. The AF function is achieved by a focus detection system that detects an in-focus state of an object, a lens drive system that moves a focus lens so as to form an object image on an image pickup element, and an AF control system that controls the focus detection system and the lens drive system. The focus detection system performs focus detection by a phase difference method, a contrast method, or the like. The lens drive system is provided with an encoder that detects a position of the focus lens. The AF control system controls a motion of the focus lens based on an output of the encoder.

Japanese Patent Laid-Open No. 2007-47652 discloses a configuration of a drive system to improve detection accuracy of a position detection encoder. Japanese Patent Laid-Open No. 2009-169052 discloses a configuration of including a ball and a ball race so that a rotation transfer ring of a lens drive system is held rotatably at a constant position.

Recently, the demand of a higher-accuracy AF is increasing in order to obtain an image which is focused on an object with higher accuracy, and therefore an encoder capable of performing position detection with higher accuracy and higher resolution is required. However, in Japanese Patent Laid-Open No. 2007-47652, a roller ring to drive a lens is held with a fitting backlash with respect to a unit body. Therefore, high accuracy of the position detection is prevented due to an unnecessary motion in the fitting backlash. In Japanese Patent Laid-Open No. 2009-169052, the rotation transfer ring is held without a backlash so as to be rotatable at the constant position by using the ball and the ball race. However, a plurality of annular ball races are necessary and it is difficult to improve a space efficiency.

BRIEF SUMMARY OF THE INVENTION

The present invention provides an encoder, a lens apparatus, and a camera capable of performing position detection with high accuracy and high resolution, and also improving a space efficiency.

An encoder as one aspect of the present invention includes a base, a cylinder rotatable in a circumferential direction with respect to the base, at least three supporting portions rotatably supporting the cylinder with respect to the base, a connecting portion provided on the cylinder and rotatable within a first range between two supporting portions of the at least three supporting portions, a scale attached to the cylinder, and a detector configured to detect a position of the cylinder with respect to the base by using the scale, and the detector is arranged within a second range different from the first range.

A lens apparatus as another aspect of the present invention includes a lens movable in an optical axis direction, a cylinder configured to rotate around an optical axis so as to move the lens in the optical axis direction, at least three supporting portions rotatably supporting the cylinder with respect to a base, a connecting portion provided on the cylinder and rotatable within a first range between two supporting portions of the at least three supporting portions, a scale attached to the cylinder, and a detector configured to detect a position of the cylinder with respect to the base by using the scale, and the detector is arranged within a second range different from the first range.

A camera as another aspect of the present invention includes a lens movable in an optical axis direction, an image pickup element configured to perform a photoelectric conversion of an object image from the lens, a cylinder configured to rotate around an optical axis so as to move the lens in the optical axis direction, at least three supporting portions rotatably supporting the cylinder with respect to a base, a connecting portion provided on the cylinder and rotatable within a first range between two supporting portions of the at least three supporting portions, a scale attached to the cylinder, and a detector configured to detect a position of the cylinder with respect to the base by using the scale, and the detector is arranged within a second range different from the first range.

Further features and aspects of the present invention will become apparent from the following description of exemplary embodiments with reference to the attached drawings.

DETAILED DESCRIPTION OF THE PREFERRED EMBODIMENTS

Figure 1:
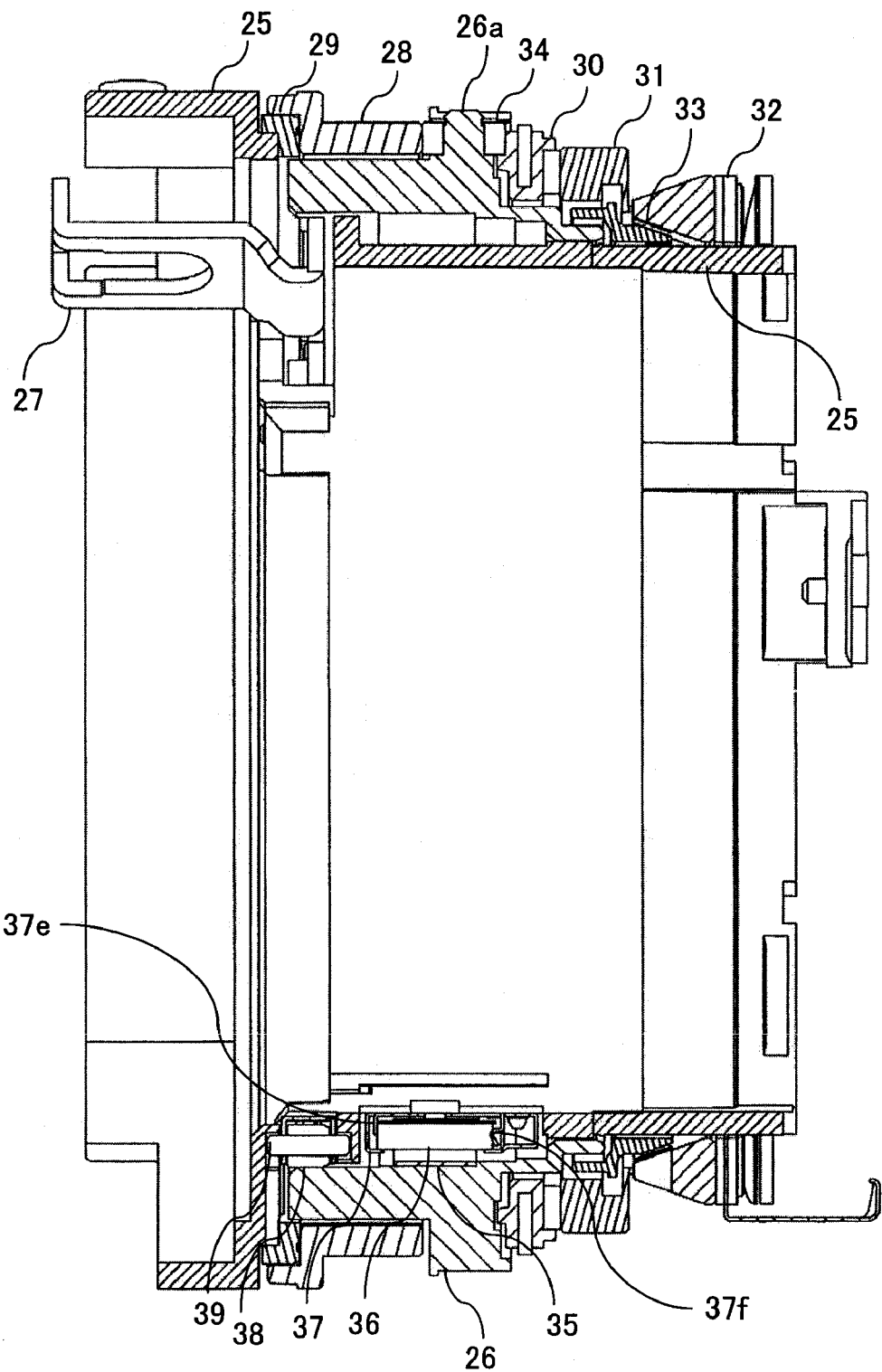
FIG. 1 is a cross-sectional view of a main part of a focus drive unit in the present embodiment.

Exemplary embodiments of the present invention will be described below with reference to the accompanied drawings. In each of the drawings, the same elements will be denoted by the same reference numerals and the duplicate descriptions thereof will be omitted.

Figure 2:
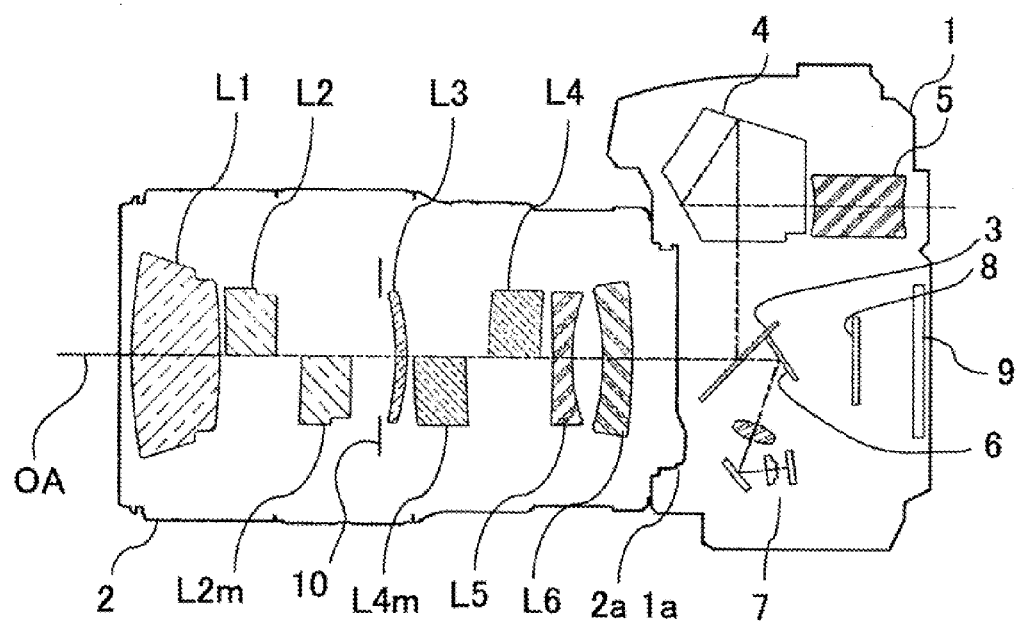
FIG. 2 is a cross-sectional view of a main part of an image pickup apparatus in the present embodiment.

First of all, referring to FIG. 2, an image pickup apparatus (an optical apparatus) in an embodiment of the present invention will be described. FIG. 2 is a cross-sectional view of a main part of a lens-interchangeable digital single-lens reflex camera (a camera body) and an interchangeable lens (a lens apparatus) that constitute an image pickup apparatus in the present embodiment. However, the present embodiment is not limited to this, and can also be applied to an image pickup apparatus (a camera) which is integrally formed by the camera body and the lens apparatus.

In FIG. 2, reference numeral 1 denotes a camera, and reference numeral 2 denotes an interchangeable lens. Reference numeral 1a denotes a camera mount of the camera 1, and reference numeral 2a denotes a lens mount of the interchangeable lens 2. The camera mount 1a and the lens mount 2a are mechanically attachable and removable by a bayonet connection, and the camera 1 and the interchangeable lens 2 perform an electric communication via these mounts. Reference numeral 3 denotes a main mirror, reference numeral 4 denotes a pentaprism, and reference numeral 5 denotes a finder lens. An object image that is imaged by the interchangeable lens 2 is reflected by the main mirror 3 so as to form an erected image by the pentaprism 4, and thus the object image can be observed by the finder lens 5. Reference numeral 6 denotes a sub mirror, and reference numeral 7 denotes a focus detection unit. With respect to the object image that is imaged by the interchangeable lens 2, a part of light beams transmitting through the main mirror 3 is reflected by the sub mirror 6 so as to be introduced to the focus detection unit 7. The focus detection unit 7 is configured by including a well-known field lens, a secondary imaging lens, and a pair of AF sensors, which performs a focus detection of a so-called phase difference method.

Reference numeral 8 denotes an image pickup element. The image pickup element 8 is configured by including a CCD, a CMOS, or the like, which is a photoelectric conversion element that converts a light intensity of an object obtained via the interchangeable lens 2 into an electric signal, i.e. performs a photoelectric conversion of an object image. A sensor surface of the image pickup element 8 and a sensor surface of the AF sensor of the focus detection unit 7 are located at positions conjugate to each other. The focus detection unit 7 can previously detect an in-focus state of the image pickup element 8. Reference numeral 9 denotes a display panel. The display panel 9 displays the object image obtained from the image pickup element 8 so as to be confirmed. The display panel 9 also performs a display to confirm other kinds of image pickup information or to set a mode of the camera based on an operation of an operating portion (not shown).

Subsequently, an image pickup optical system of the interchangeable lens 2 will be described. In FIG. 2, reference symbol L1 denotes a first lens unit, reference symbol L2 denotes a second lens unit, reference symbol L3 denotes a third lens unit, reference symbol L4 denotes a fourth lens unit, reference symbol L5 denotes a fifth lens unit, and reference symbol L6 denotes a sixth lens unit. The first lens unit L1, the third lens unit L3, the fifth lens unit L5, and the sixth lens unit L6 are lens units that are fixed in a direction of an optical axis OA (in an optical axis direction). On the other hand, the second lens unit L2 and the fourth lens unit L4 move in the optical axis direction so as to perform an in-focus operation (a focusing). The second lens unit L2 and the fourth lens unit L4 that are illustrated at the upper side of the optical axis OA in FIG. 2 indicate a state where the lens units are focused on an object at infinity. On the other hand, the second lens unit L2m and the fourth lens unit L4m illustrated at the lower side of the optical axis OA indicate a state where the lens units are focused on an object at a minimum distance. Reference numeral 10 denotes an aperture stop, which adjusts the light intensity of the object that is imaged by the interchangeable lens 2.

Figure 3:
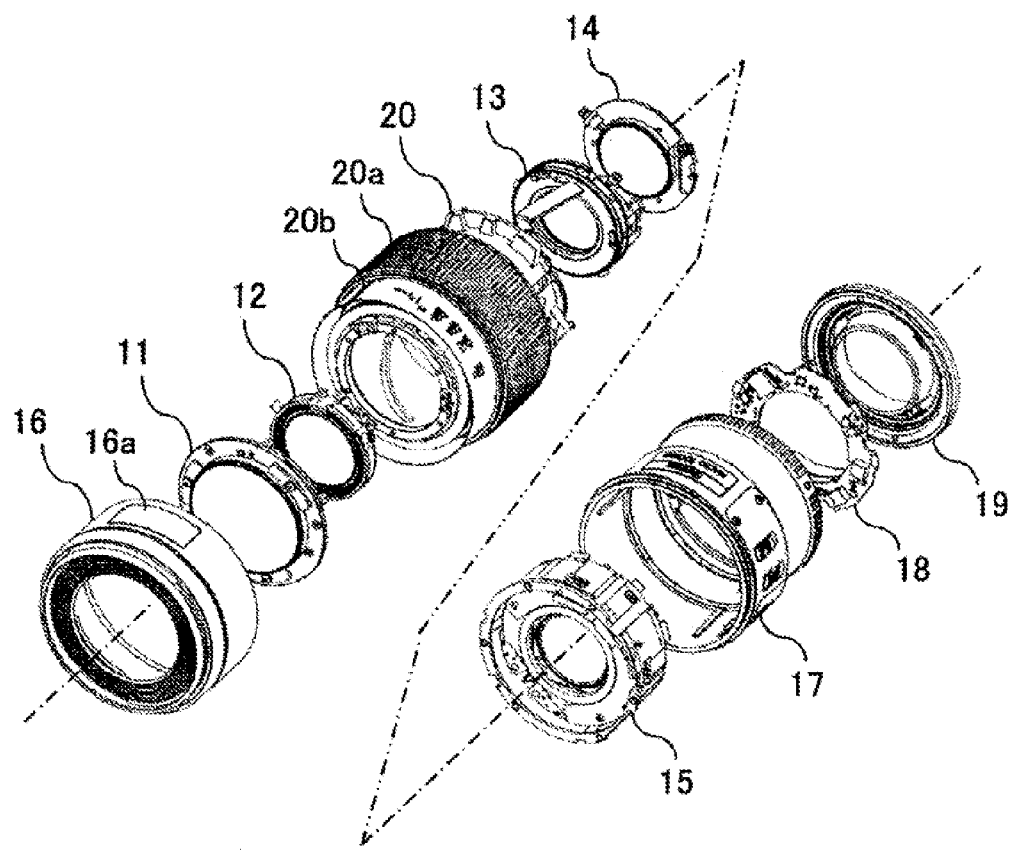
FIG. 3 is an exploded perspective view of an interchangeable lens in the present embodiment.

Next, referring to FIG. 3, a configuration of the interchangeable lens 2 will be described. FIG. 3 is an exploded perspective view of the interchangeable lens 2. Reference numeral 11 denotes a first lens unit that includes the first lens unit L1, reference numeral 12 denotes a second lens unit that includes the second lens unit L2, and reference numeral 13 denotes a third lens unit that includes the third lens unit L3 and the aperture stop 10. Reference numeral 14 denotes a fourth lens unit that includes the fourth lens unit L4, and reference numeral 15 denotes a fifth lens unit that includes the fifth lens unit L5 and the sixth lens unit L6. Reference numeral 16 denotes a front-side fixed ring unit, which includes a transparent window 16a. Reference numeral 17 denotes a rear-side fixed ring unit, reference numeral 18 denotes a main substrate, and reference numeral 19 denotes a lens mount unit. Reference numeral 20 denotes a focus unit, which includes the second lens unit 12, the third lens unit 13, and the fourth lens unit 14 and performs the in-focus operation (the focusing). Reference numeral 20a denotes a manual operation ring that is provided on the focus unit 20. A user manually operates the manual operation ring 20a (performs a rotational operation around the optical axis), and thus a drive ring 26 moving along with the manual operation ring 20a, described below, can be rotated around the optical axis. As a result, the lens units (the second lens unit L2 and the fourth lens unit L4) are movable in the optical axis direction, and an in-focus state can be adjusted. Reference numeral 20b denotes a distance index that displays an object distance. Based on the distance index 20b, the object distance can be confirmed via the transparent window 16a of the front-side fixed ring unit 16.

A controller (not shown) of the camera 1 detects the in-focus state of the object based on the output of the focus detection unit 7, and communicates a lens drive amount to the interchangeable lens 2 via the camera mount 1a and the lens mount 2a. The interchangeable lens 2 performs the in-focus operation based on an instruction of the controller provided on the main substrate 18. After the in-focus operation is completed, the main mirror 3 and the sub mirror 6 are removed from an optical path so that a shot image can be obtained by the image pickup element 8.

Figure 4:
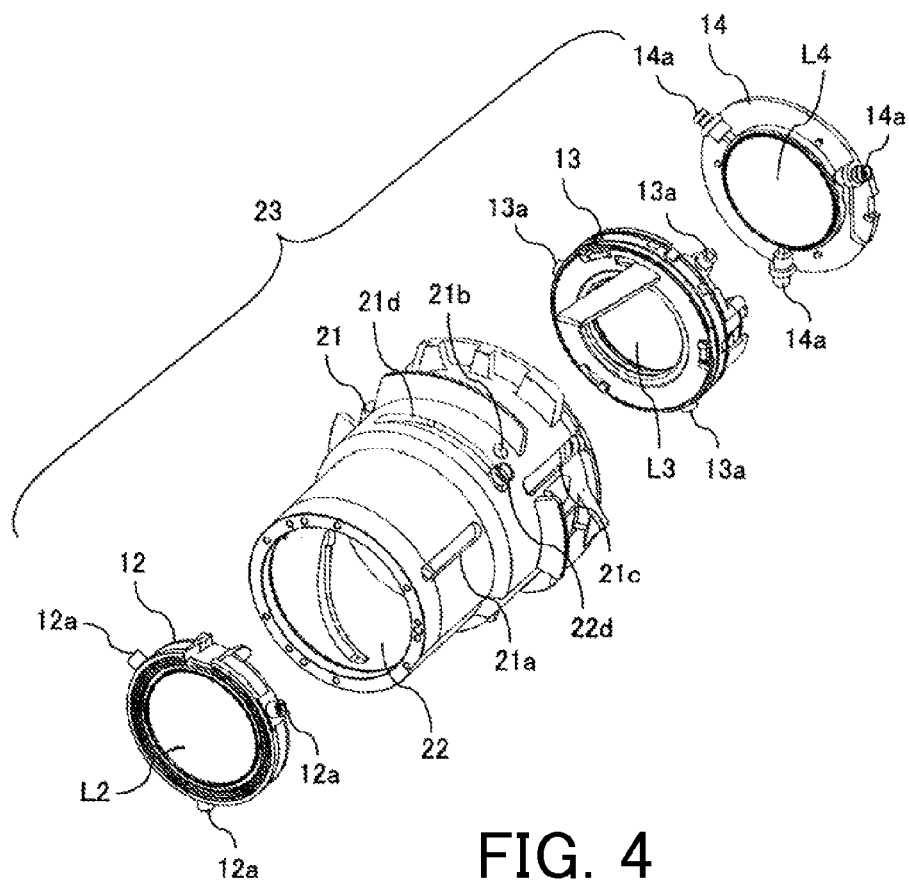
FIG. 4 is an exploded perspective view of a focus lens unit in the present embodiment.

Next, referring to FIGS. 4 to 7A and 7B, a configuration of the focus unit 20 will be described in detail. FIG. 4 is an exploded perspective view of the focus lens unit 23. The second lens unit 12 includes three cam follower pins 12a on its periphery, the third lens unit 13 includes three support pins 13a on its periphery, and the fourth lens unit 14 includes three cam follower pins 14a in its periphery. Reference numeral 21 denotes a guide cylinder that guides each lens unit while supporting them. The three cam follower pins 12a are supported by three straight grooves 21a so as to guide the second lens unit 12 in a straight direction. The third lens unit 13 is supported to be fixed by three holes 21b via the three support pins 13a. In addition, the three cam follower pins 14a are supported by three straight grooves 21c so as to guide the fourth lens unit 14 in the straight direction.

Figure 5:
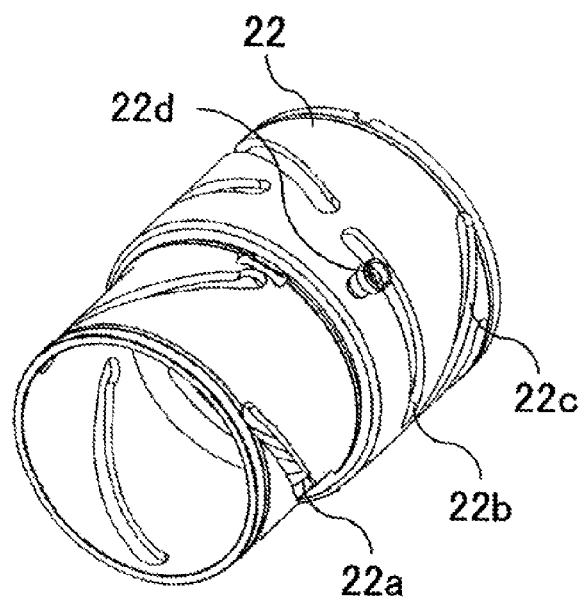
FIG. 5 is a perspective view of a cam cylinder unit in the present embodiment.

Reference numeral 22 denotes a cam cylinder that is rotatably supported at a fixed position inside the guide cylinder 21. FIG. 5 is a perspective view of the cam cylinder 22 (a cam cylinder unit). Hereinafter, the guide cylinder 21 and the cam cylinder 22 will be collectively described. The cam cylinder 22 is provided with three cam grooves 22a and three cam grooves 22c that prevent inclinations of the second lens unit 12 and the fourth lens unit 14. Reference numeral 22d denotes a connection pin that rotates the cam cylinder 22 with respect to the guide cylinder 21. As illustrated in FIG. 4, the connection pin 22d is protruded from a groove 21d formed in a circumferential direction toward an outer circumference. Since the third lens unit 13 is supported and fixed on the guide cylinder 21, three escape grooves 22b of the support pins 13a are provided on the cam cylinder 22.

Figure 6A:
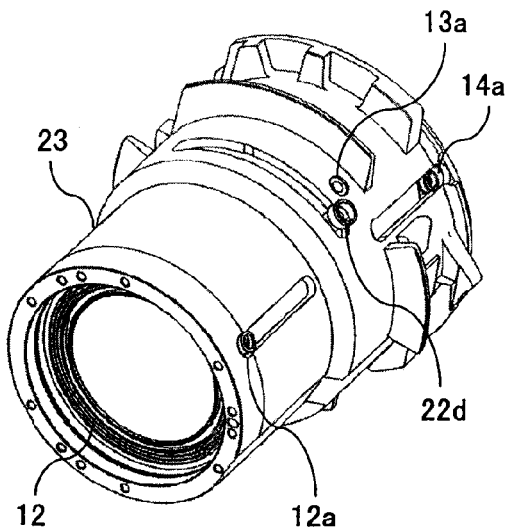
FIGS. 6A and 6B are perspective views of the focus lens unit in the present embodiment.
Figure 6B:
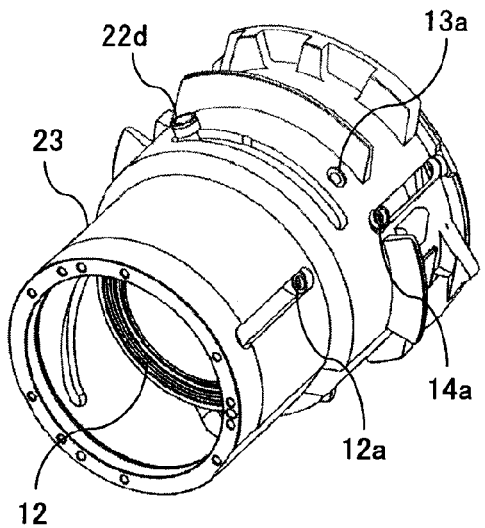
Figure 7A:
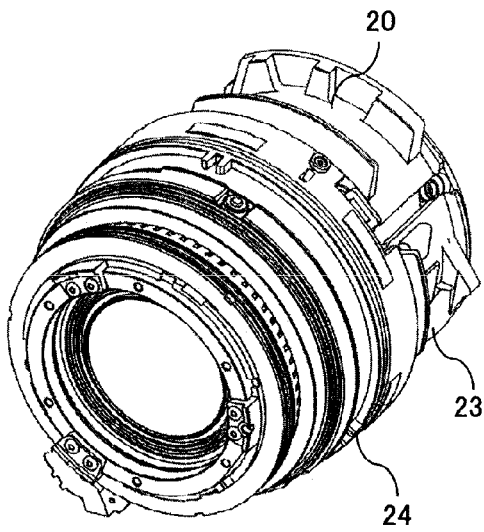
FIGS. 7A and 7B are perspective views of a focus unit in the present embodiment.
Figure 7B:
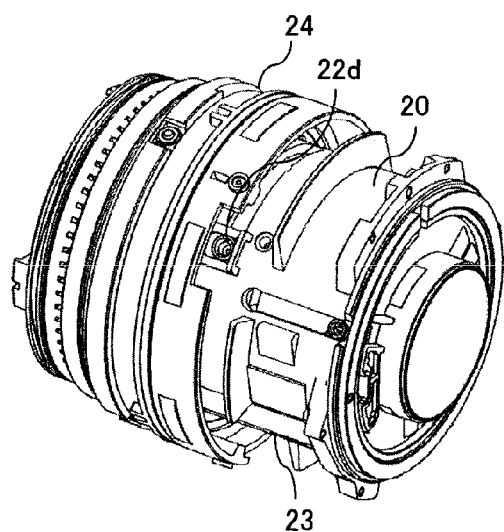

FIGS. 6A and 6B are perspective views of the focus lens unit 23. FIG. 6A is a state where the second lens unit L2 and the fourth lens unit L4 illustrated at the upper side of the optical axis OA in FIG. 2 are focused on the object at infinity. On the other hand, FIG. 6B is a state where the second lens unit L2 and the fourth lens unit L4 illustrated at the lower side of the optical axis OA in FIG. 2 are focused on the object at the minimum distance. FIGS. 7A and 7B are perspective views seen in two directions of the focus unit 20. In FIGS. 7A and 7B, the manual operation ring 20a and the distance index 20b are omitted. The focus unit 20 is configured by including the focus lens unit 23 and a focus drive unit 24 described below. The connection pin 22d of the focus lens unit 23 is rotated by the focus drive unit 24 so that the in-focus operation (the focusing) is performed.

Figure 8:
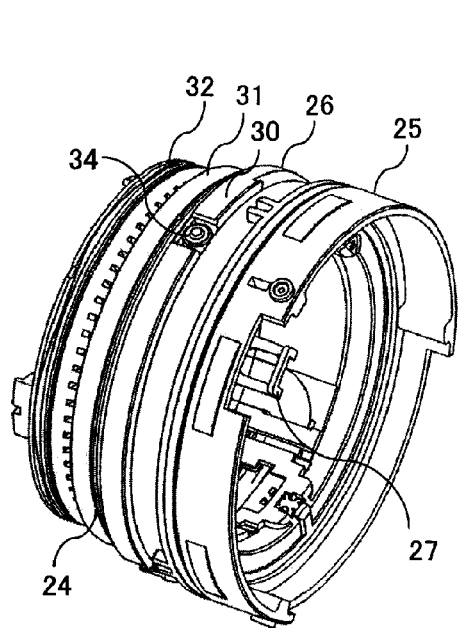
FIG. 8 is a perspective view of the focus drive unit in the present embodiment.
Figure 9:
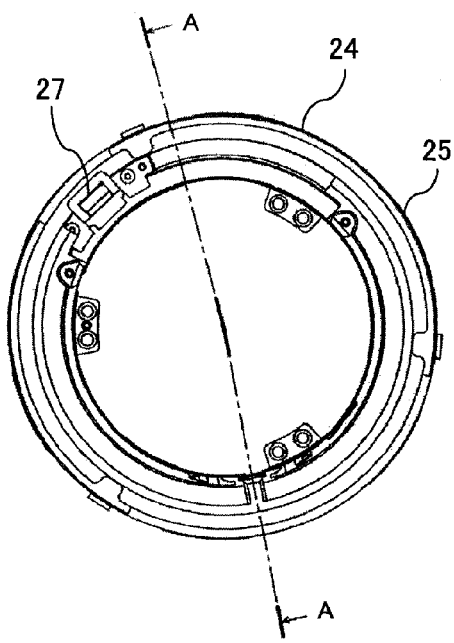
FIG. 9 is a back view of the focus drive unit in the present embodiment.
Figure 10:
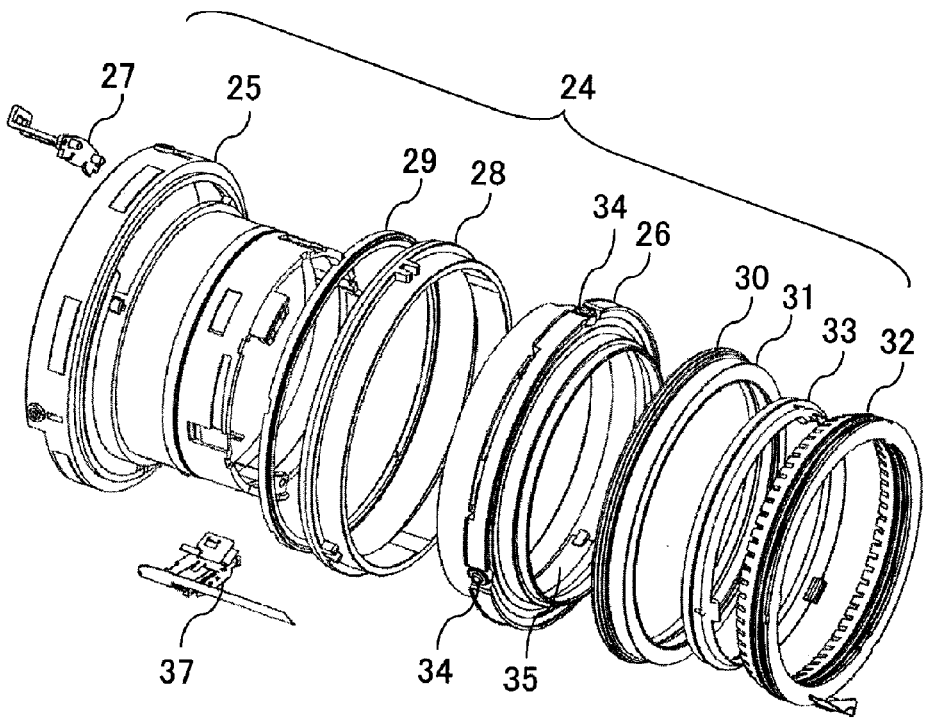
FIG. 10 is an exploded perspective view of the focus drive unit in the present embodiment.

Next, referring to FIGS. 1 and 8 to 10, a configuration of the focus drive unit 24 will be described in detail. FIG. 8 is a perspective view of the focus drive unit 24, which is seen in the same direction as that of FIG. 7B. FIG. 9 is a back view of the focus drive unit 24. FIG. 1 is a cross-sectional view of a main part of the focus drive unit 24 along a line A-A illustrated in FIG. 9. FIG. 10 is an exploded perspective view of the focus drive unit 24.

Reference numeral 25 denotes a drive base (abase), and reference numeral 26 denotes a drive ring (a cylinder) that is rotatable in its circumferential direction with respect to the drive base 25. Reference numeral 27 denotes a connection key (a connecting portion) that is provided on the drive ring 26. The connection key 27 is fixed by using two screws, and engages with an interlocking pin 22d of the focus lens unit 23 as illustrated in FIG. 7B. In the present embodiment, the connection key 27 is configured separately from the drive ring 26, but the embodiment is not limited to this. For example, a shape portion integrally provided on the drive ring 26 may also be used as the connection key (the connecting portion).

Reference numeral 28 denotes a manual interlocking ring, and reference numeral 29 denotes a slide ring. The slide ring 29 is fitted into the drive base 25 on its diameter. The manual interlocking ring 28 is rotatably fitted into the slide ring 29 on its diameter. Reference numeral 30 denotes a USM interlocking ring, reference numeral 31 denotes a USM rotor, reference numeral 32 denotes a USM stator unit that includes a pressure plate spring, and reference numeral 33 denotes a ring for preventing a rotation of a stator. A well-known vibrational wave motor is configured by the USM rotor 31, the USM stator unit 32, and the ring 33 for preventing the rotation of the stator. The USM interlocking ring 30 and the USM rotor 31 rotate integrally with each other.

Reference numeral 34 denotes three differential rollers, which are rotatably supported by three shafts 26a provided on the periphery of the drive ring 26 in a radial direction. The three differential rollers 34 are held between the manual interlocking ring 28 and the USM interlocking ring 30 by a pressure force of the pressure plate spring included in the USM stator unit 32 so as to support the drive ring 26 in the optical axis direction. The drive ring 26 is rotatably supported at a fixed position, and the details of a supporting configuration of a rotating shaft will be described below. When the USM rotor 31 is rotated by the USM stator unit 32, the differential roller 34 that is held between the manual interlocking ring 28 that is stopped and the USM interlocking ring 30 that is rotating performs a rolling movement on the manual interlocking ring 28 so as to rotate the drive ring 26. When the manual interlocking ring 28 is rotated, the differential roller 34 performs the rolling movement on the USM interlocking ring 30 that is stopped so that the drive ring 26 rotates. The manual interlocking ring 28 engages with the manual operation ring 20a of FIG. 3 so as to transfer the rotation, and the manual operation ring 20a can be manually rotated so as to rotate the drive ring 26. In other words, the drive ring 26 can be always rotated electrically and manually, which has a configuration of a so-called full-time manual.

Reference numeral 35 denotes a film scale (a scale) that constitutes an optical position detection encoder. The film scale 35 is a reflection scale that has a reed shape and flexibility, which is attached to an inner wall of the drive ring 26, i.e. which is attached along the inner wall. Reference numeral 36 denotes a sensor head that constitutes a position detection encoder, and reference numeral 37 denotes a sensor holder that holds the sensor head 36. The sensor head 36 is positioned with respect to the film scale 35 via the sensor holder 37 with high accuracy so as to be integrally fixed to the drive base 25. Reference numeral 38 denotes a guide roller. Reference numeral 39 denotes a rotating shaft of the guide roller 38, which rotatably supports the drive ring 26 at a fixed position.

Figure 11A:
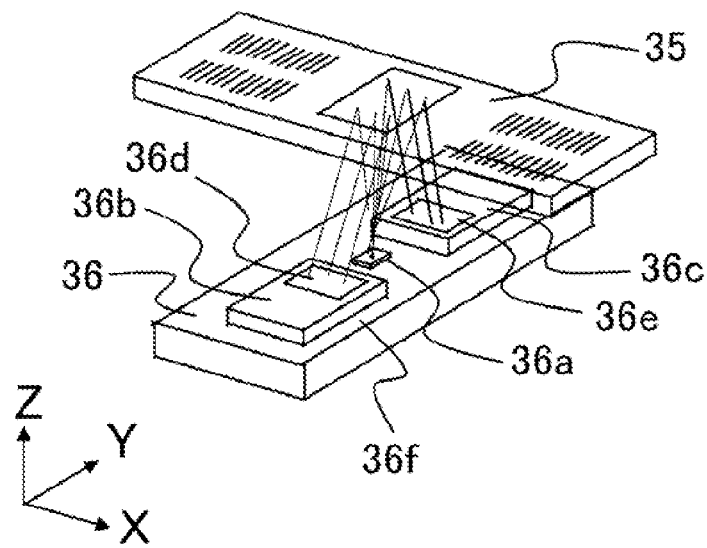
FIGS. 11A and 11B are configuration diagrams of an encoder in the present embodiment.
Figure 11B:
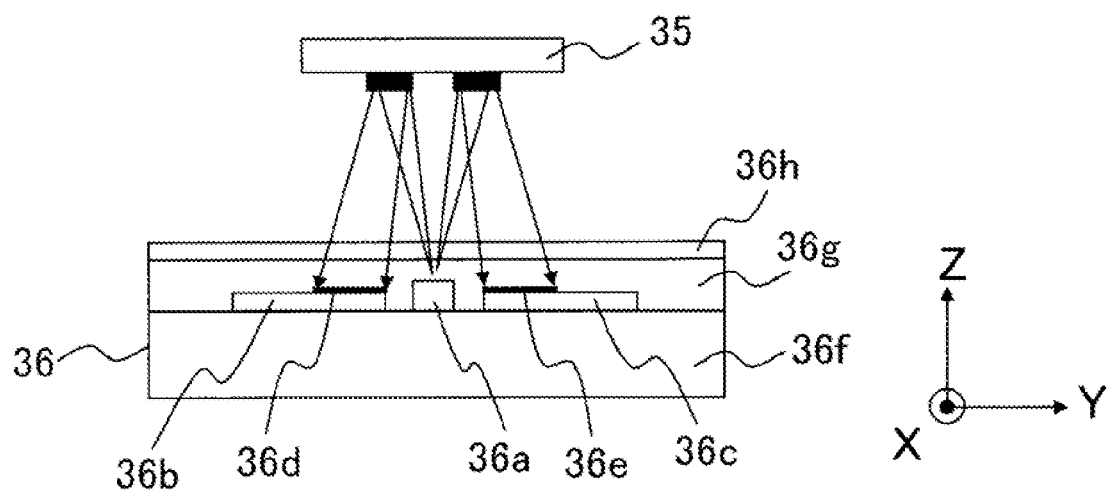

Next, referring to FIGS. 11A, 11B, 12A, 12B, 13, and 14A to 14C, a configuration and a detection principle of the optical position detection encoder will be described. The encoder of the present embodiment is so-called an absolute encoder that is capable of detecting an absolute position, but is not limited to this. The term of the "absolute position" means a position of the scale or the drive ring 26 attached to the scale relative to the sensor head 36. As an encoder other than the absolute encoder that detects the absolute position, there is an encoder capable of detecting a displacement of the scale with respect to the sensor head per time. The encoder (the scale) of the present invention may be any one of these encoders. The term of the position of the drive ring, i.e. the cylinder that is an object to be detected, in the present invention means a position in a rotating direction, and a command signal is generated in accordance with the position of this rotating direction. FIGS. 11A and 11B are configuration diagrams of the optical encoder of the present embodiment, and FIGS. 11A and 11B illustrate a perspective view and a cross-sectional views, respectively. For easy understanding, the embodiment is described by using a configuration developed in a circumferential direction. With respect to coordinate axes in FIGS. 11A and 11B, an X-axis direction indicates a development direction of the circumferential direction, a Y-axis direction indicates the optical axis direction, and a Z-axis direction indicates the radial direction. FIG. 11B is a cross-sectional view seen in the X-axis direction, which corresponds to a cross section on a plane perpendicular to the optical axis OA.

The film scale 35 is disposed so as to face, i.e. so as to be opposed to, the sensor head 36. The film scale 35 is integrally fixed to the drive ring 26 and is movable in the X-axis direction that is a grating array direction. Reference numeral 36a denotes a light source that is configured by including an LED chip. Reference numerals 36b and 36c are two photo IC chips each containing a signal processing circuit. Reference numerals 36d and 36e are two light receiving elements that are configured by including photodiode arrays mounted on the photo IC chips 36b and 36c, respectively. Reference numerals 36f denotes a printed circuit board, reference numeral 36g denotes a transparent resin, and reference numeral 36h denotes a protection glass. The light source 36a and the photo IC chips 36b and 36c are mounted on the printed circuit board 36f, and are molded with the transparent resin 36g on which the protection glass 36h is covered.

Figure 12A:
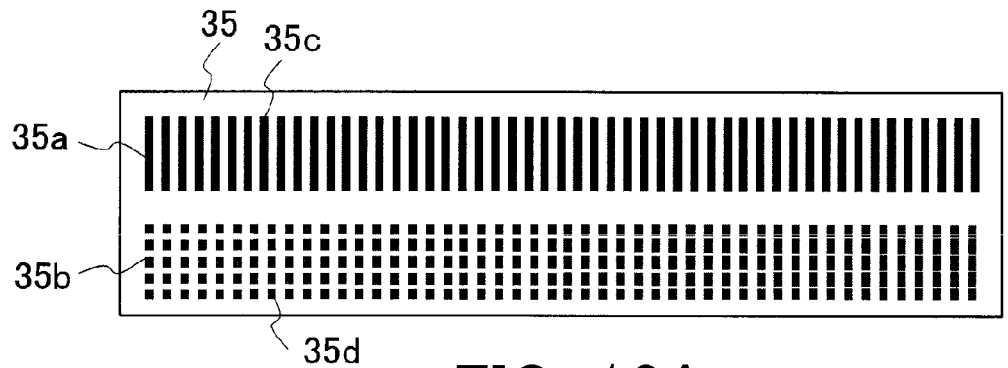
FIGS. 12A and 12B are configuration diagrams of a film scale in the present embodiment.
Figure 12B:
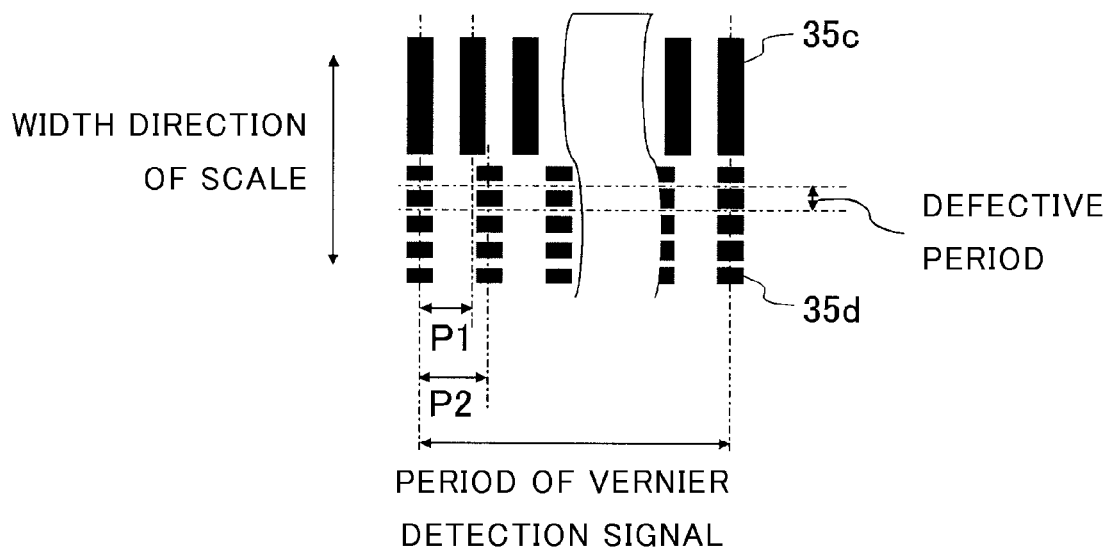

Next, referring to FIGS. 12A and 12B, a configuration of an optical scale (the film scale 35) will be described. FIG. 12A is a view of an overall structure of the film scale 35, and FIG. 12B is an enlarged view of a slit pattern. The slit pattern is formed by a reflective film. The film scale 35 has tracks including a first track 35a and a second track 35b. The first track 35a is provided at the upper side (see FIG. 12B) of a width direction of the scale. The second track 35b is provided at the lower side (see FIG. 12B) of the width direction of the scale. The reflective pattern of the first track 35a is a periodic pattern 35c with a pitch P, and the reflective pattern of the second track 35b is a periodic pattern 35d with a pitch P2 that is slightly wider than the pitch P. A period of a vernier detection signal is obtained by each of these pitches. The pattern 35d is a pattern with defects at regular intervals in the width direction of the scale, i.e. a pattern having a predetermined defective period. As illustrated in FIG. 12A, the pattern 35d is configured so that a width of a reflective area of a reflective portion changes in a moving direction. Light emitted from the light source 36a is illuminated on a reflective pattern (the patterns 35c and 35d) of the film scale 35.

The lights illuminated on the first track 35a where the pattern 35c is formed and on the second track 35b where the pattern 35d is formed are reflected by the respective patterns so as to enter the light receiving portions 36d and 36e. A light emitting amount of the light source 36a is controlled based on a total output amount with respect to an incident light amount on the light receiving portion 36d so that an amplitude of the output of the light receiving portion 36d is kept to be a certain value. As a result, a configuration that is not affected by a change of a light emitting efficiency of the light source 36a caused by a temperature environment, a time degradation, or the like can be obtained.

Figure 13:
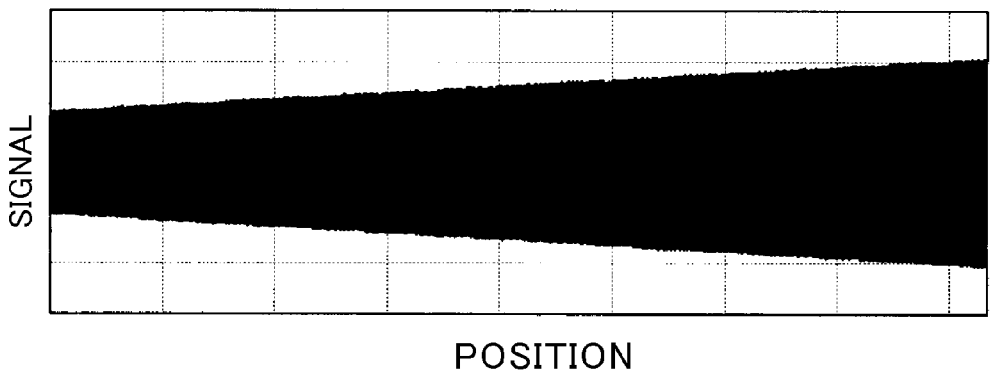
FIG. 13 is an example of a sensor output of a second track in the present embodiment.

FIG. 13 is an example of an output of the sensor for the second track 35b, which illustrates a raw waveform of a signal outputted with respect to the reflective pattern 35d of the second track 35b. As illustrated in FIG. 13, the amplitude of the signal changes in accordance with the reflective area corresponding to the defective pattern described above, i.e. in accordance with a position of the patterns. The signals obtained from the light receiving portions 36d and 36e (the photo IC chips 36b and 36c) are a pair of sine-wave signals where phases are shifted by 90 degrees from each other, corresponding to the pitch P1 of the pattern 35c and the pitch P2 of the pattern 35d, respectively.

Figure 14A:
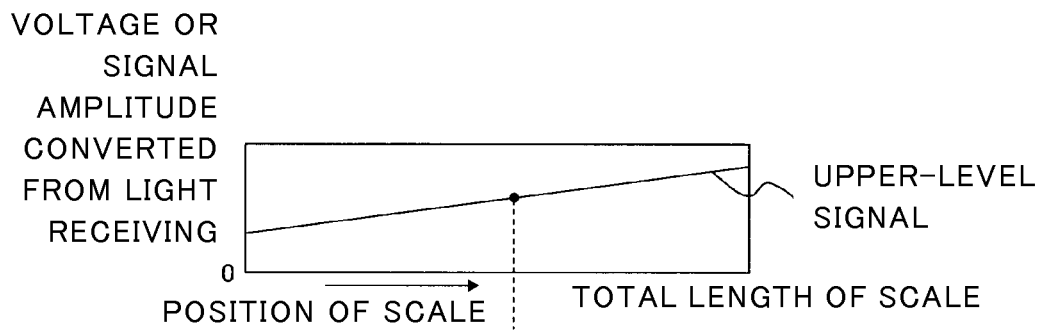
FIGS. 14A to 14C are diagrams of describing a signal synchronization in the present embodiment.
Figure 14B:
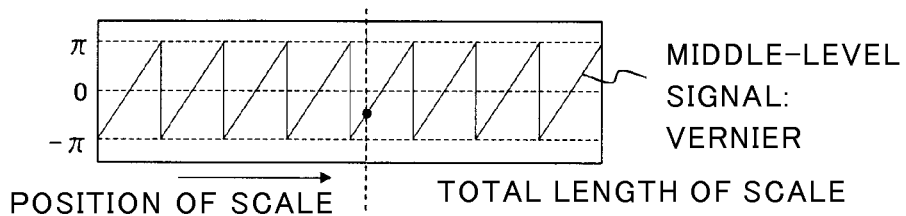
Figure 14C:
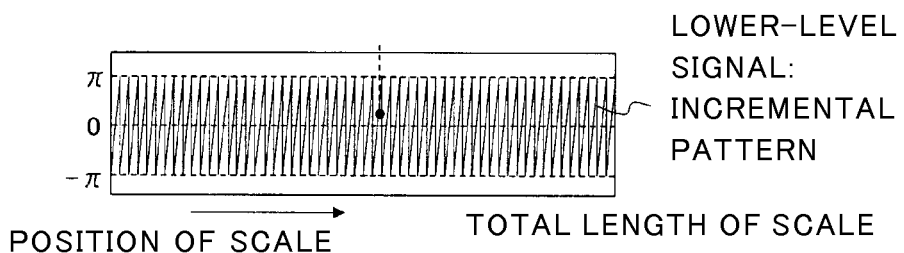

Next, referring to FIGS. 14A to 14C, a principle of detecting the absolute position will be described. FIGS. 14A to 14C are diagrams of describing a signal synchronization, which illustrate a relation between the signal amplitude (a voltage converted from the light receiving amount) and the position of the scale. FIG. 14C is a lower-level signal (an incremental pattern), which is a phase signal that is obtained by performing an arctangent conversion of the two sine-wave signals having phases different from each other by 90 degrees of the pitch P1 obtained from the photo IC chip 36b (the light receiving portion 36d) and that repeats between −n and +n. Similarly, a phase signal having the pitch P2 is obtained from the photo IC chip 36c (the light receiving portion 36e). A signal that is obtained by subtracting these phase signals is a middle-level signal (vernier) illustrated in FIG. 14B. Since the middle-level signal is a difference signal of the phases, an error of the original signal is amplified and therefore the accuracy is deteriorated compared to the accuracy of the lower-level signal. FIG. 14A illustrates an upper-level signal, which corresponds to an amplitude of the signal illustrated in FIG. 13. The absolute position is obtained by specifying what number of a repeating signal of the middle-level signal based on the output of the upper-level signal and then specifying what number of the lower-level signal in the repeating signal of the middle-level signal based on the output of the middle-level signal. When the accuracies of the first track 35a and the patterns 35c and 35d of the second track 35b are deteriorated by some reason, there is a possibility that the middle-level signal and the lower-level signal are greatly deteriorated and thus the signal synchronization cannot be performed. Therefore, the patterns 35c and 35d need to be maintained with high accuracy.

Figure 15:
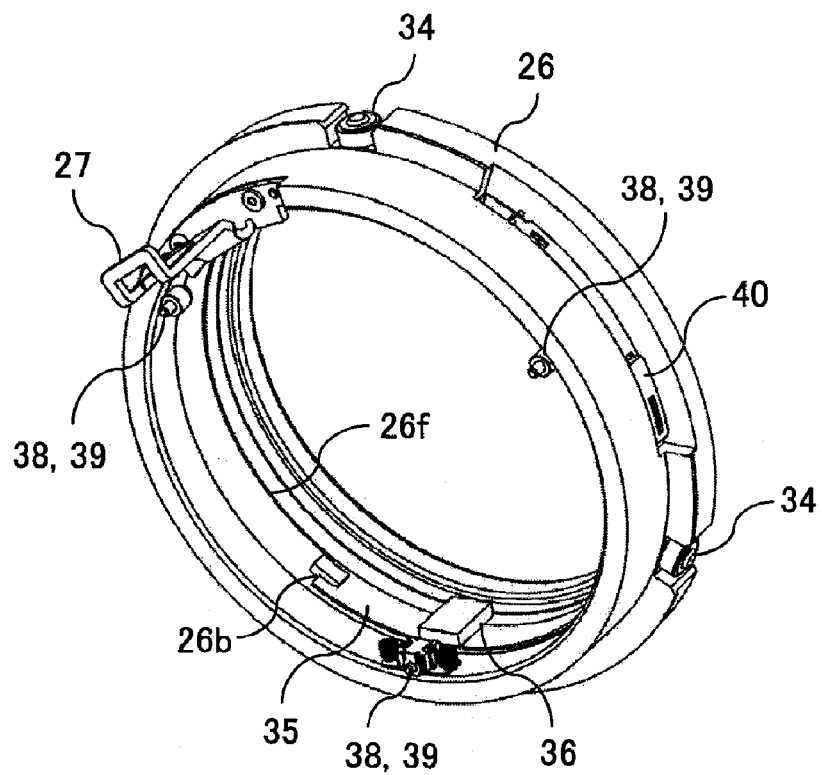
FIG. 15 is a perspective view of a main part around a drive ring unit in the present embodiment.
Figure 16:
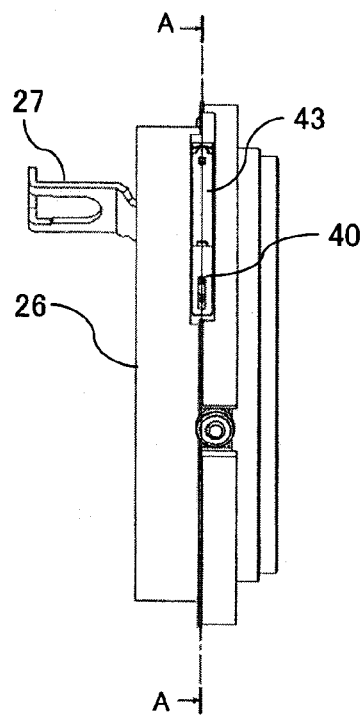
FIG. 16 is a side view of the drive ring unit in the present embodiment.
Figure 17:
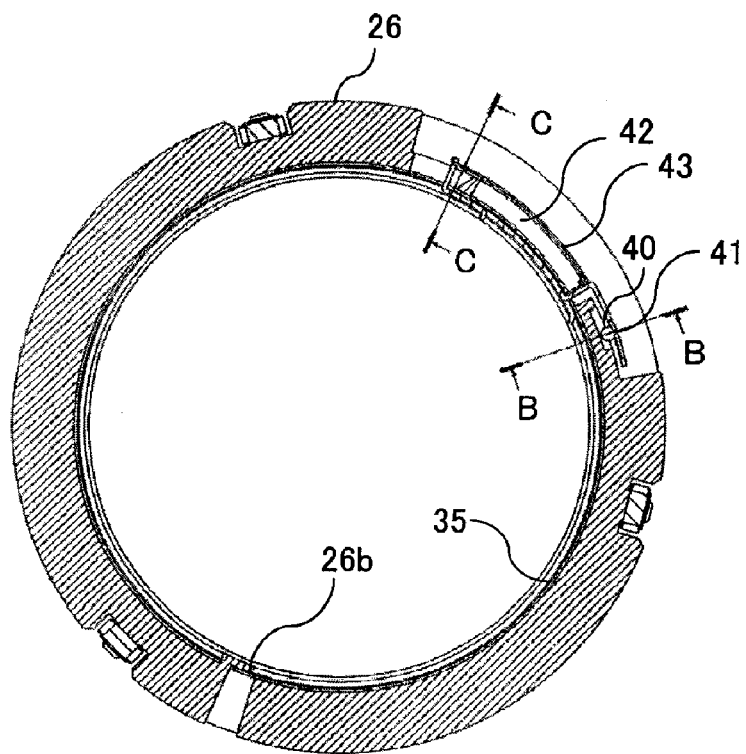
FIG. 17 is a cross-sectional view of the drive ring unit in the present embodiment.

Next, referring to FIGS. 15 to 17, a configuration of the drive ring unit will be described in detail. FIG. 15 is a perspective view of a main part on the periphery of the drive ring unit. In the present embodiment, a configuration that includes the differential roller 34, the connection key 27, and the mechanism of the holder of the film scale 35 that are integrated with the drive ring 26 is referred to as the drive ring unit. FIG. 16 is a side view of the drive ring unit, and FIG. 17 is a cross-sectional view along a line A-A in FIG. 16. Reference numeral 26b is a fixed protrusion (a fixed holder) that performs a position regulation (a position limitation) for one end of the film scale 35 provided on the inner wall of the drive ring 26 in the circumferential direction and in the radial direction (in a radiation direction).

Reference numeral 40 denotes a scale holding plate (a scale holder). The scale holding plate 40 is configured so as to be movable in the circumferential direction of the drive ring 26, i.e. around the optical axis, which holds the film scale 35. Reference numeral 41 denotes a ball that regulates (limits) a position of the scale holding plate 40 in the optical axis direction. Reference numeral 42 denotes a scale biasing spring (a scale biasing portion). The scale biasing spring 42 biases the film scale 35 via the scale holding plate 40 in the circumferential direction of the drive ring 26. In the present embodiment, the scale biasing spring 42 is a coil spring (a compression coil spring), but the embodiment is not limited to this. Reference numeral 43 denotes a spring cover that prevents the scale biasing spring 42 from coming off. Thus, one end of the film scale 35 is held by the fixed protrusion 26b that is provided on the drive ring 26, and the other end of the film scale 35 is biased by the scale biasing spring 42 in the circumferential direction so as to be attached to the inner wall of the drive ring 26.

Figures 18A, 18B:
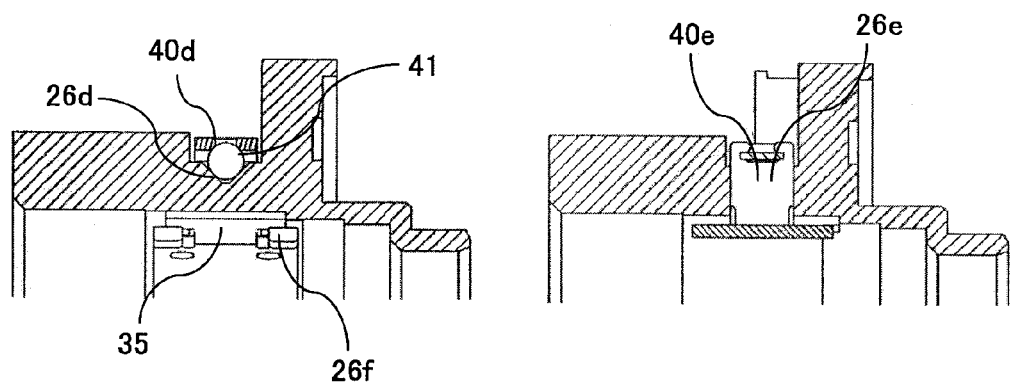
FIGS. 18A and 18B are cross-sectional views in an optical axis direction of a scale holder in the present embodiment.
Figure 19:
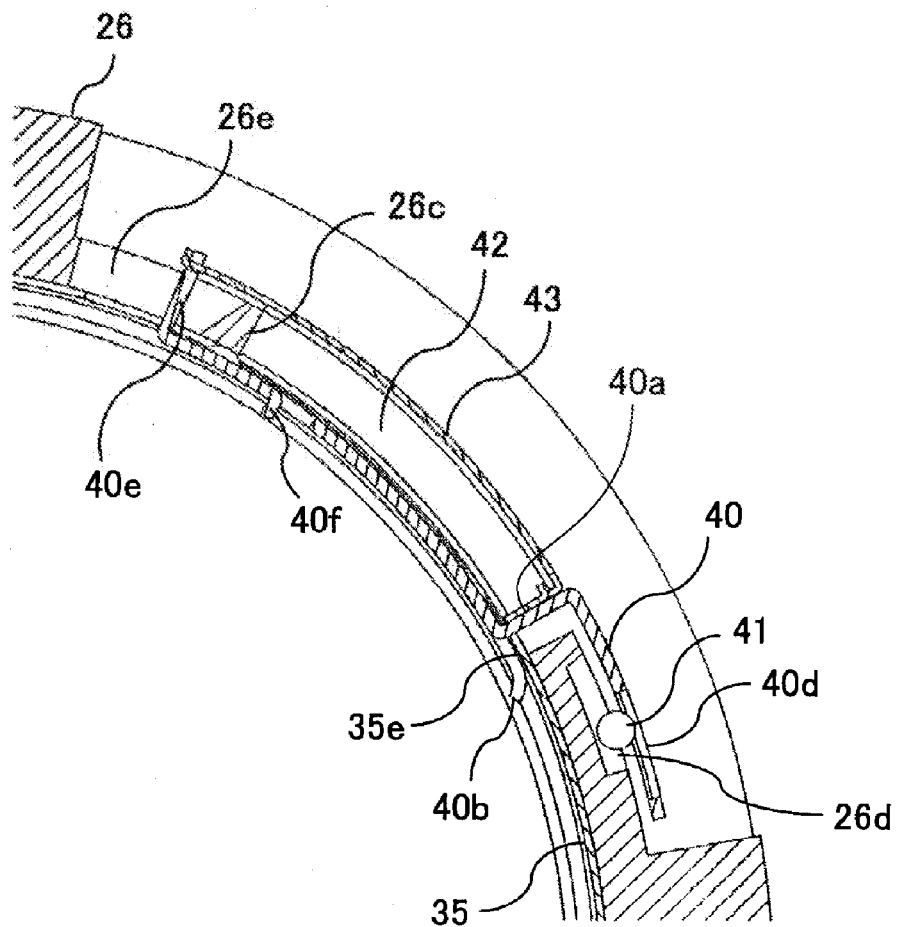
FIG. 19 is a detailed cross-sectional view of the scale holder in the present embodiment.
Figure 20:
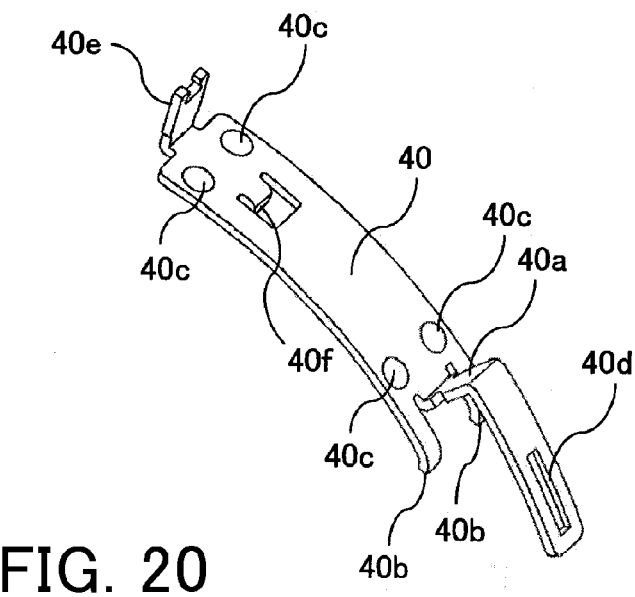
FIG. 20 is a perspective view of a scale holding plate in the present embodiment.

Next, referring to FIGS. 18A and 18B, 19, and 20, a scale holding structure including the scale holding plate 40 will be described. FIGS. 18A and 18B are cross-sectional views of the scale holding structure in the optical axis direction, and FIGS. 18A and 18B are cross-sectional views along lines B-B and C-C in FIG. 17, respectively. FIG. 19 is a detailed cross-sectional view of the scale holding structure, and FIG. 20 is a perspective view of the scale holding plate 40.

The scale biasing spring 42 acts as a strut between a fixed portion 26c of the drive ring 26 and a spring receiving portion 40a of the scale holding plate 40 so as to give a biasing force to an end portion 35e of the film scale 35. The end portion 35e of the film scale 35 is prevented from coming off in the radial direction by the protrusion 40b of the scale holding plate 40. Thus, the protrusion 40b is a radial direction limiting portion that limits the movement of the film scale 35 in the radial direction of the drive ring 26 in a holding state of the film scale 35. Furthermore, a spherical shape protrusion 40c provided on the scale holding plate 40 abuts against the inner wall of the drive ring 26 so as to limit the position of the scale holding plate 40 in the radial direction.

The scale holding plate 40 has a groove 40d (a first groove) that is formed in the circumferential direction. The drive ring 26 has a groove 26d (a second groove) that is formed in the circumferential direction. A ball 41 that is movable along the groove 40d and the groove 26d is provided between the groove 40d and the groove 26d. In other words, the ball 41 is held between the groove 40d that is formed on the scale holding plate 40 in the circumferential direction and the groove 26d that is formed on the drive ring 26 in the circumferential direction. According to this configuration, a motion of the scale holding plate 40 in the circumferential direction can be smooth and the movement of the scale holding plate 40 in the optical axis can be prevented. An end portion 40e of the scale holding plate 40 is limited by a setting of fitting into the groove 26e of the drive ring 26. A positioning of the optical axis direction of the film scale 35 is performed by contacting (abutting against) a step portion 26f in the radial direction of the drive ring 26.

According to the configuration described above, the position of the scale holding plate 40 is limited so as to be movable in the circumferential direction, and the film scale 35 can act as the strut so as to be fixed on the inner wall of the drive ring 26. Since the film scale 35 is fixed by an elastic force of the scale biasing spring 42, an impossible force cannot be applied even when the film scale 35 is expanded or contracted by a temperature change, a moisture absorption, or the like. Therefore, the pattern 35c of the first track 35a and the pattern 35d of the second track 35b can be maintained with high accuracy. If both the end portions of the film scale 35 are fixed to the drive ring 26, a strain of the film scale 35 is generated by the expansion or the contraction. As a result, the accuracies of the lower-level signal and the middle-level signal illustrated in FIGS. 14B and 14C may be deteriorated too much to synchronize the signals.

Figure 21:
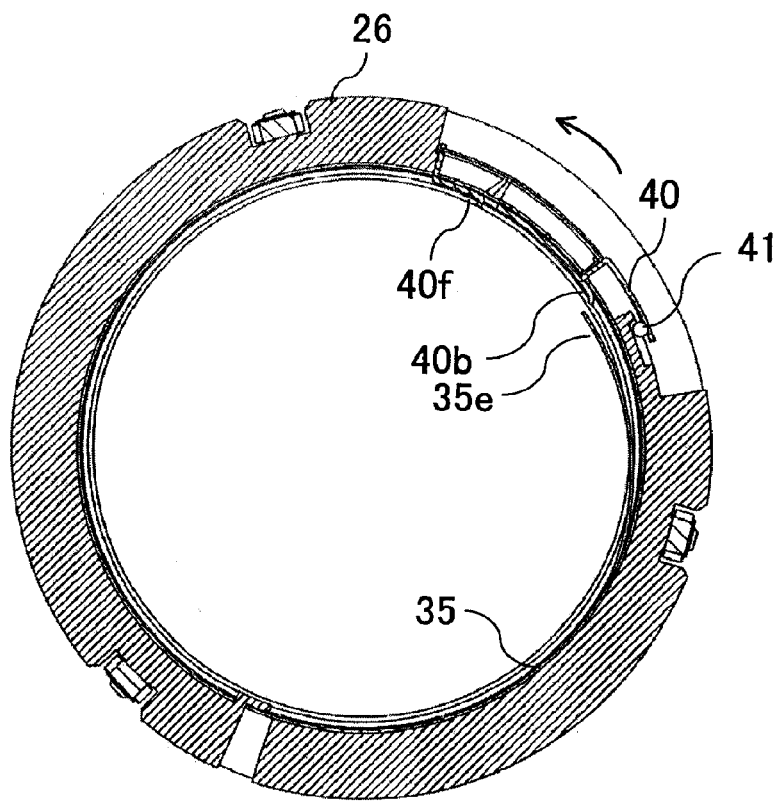
FIG. 21 is a cross-sectional view of describing an attachment and a removal of the film scale in the present embodiment.

FIG. 21 is a cross-sectional view of describing the attachment and the removal of the film scale 35, which illustrates a cross section at the same position as that of FIG. 17. The scale holding plate 40 is retracted in a counterclockwise direction (in an arrow direction) up to a position where the protrusion 40b does not limit the end portion 35e of the film scale 35. Therefore, the end portion 35e of the film scale 35 floats in the radial direction (in an inside diameter direction).

Figures 22A, 22B, 22C:
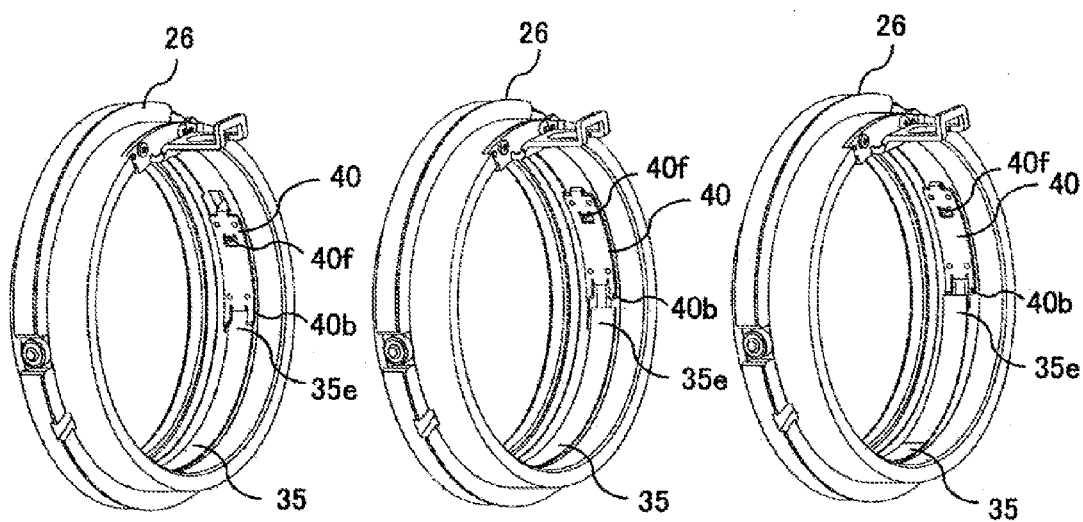
FIGS. 22A to 22C are perspective views of describing the attachment and the removal of the film scale in the present embodiment.

FIGS. 22A to 22C are perspective views of describing the attachment and the removal of the film scale 35. FIG. 22A illustrates a state where the film scale 35 is fixed to the drive ring 26 (a holding state of the film scale 35). FIG. 22B illustrates a state where the scale holding plate 40 is retracted (an unlimited state of the film scale 35). FIG. 22C illustrates the same state as that of FIG. 21. The film holding plate 40 is movable to a release position, i.e. an unlimited position, (FIGS. 22B and 22C) where the limitation of the film scale 35 by the protrusion 40b (the radial direction limiting portion) is released. Therefore, the film scale 35 can be easily attached to and removed from the drive ring 26. When a protrusion 40f is provided on the scale holding plate 40, the operation for retracting the scale holding plate 40 is further easy, and therefore the workability when the film scale 35 is attached to and removed from the drive ring 26 can be improved. In addition, since the scale biasing spring 42 is configured by a coil spring, a spring constant can be set to be small while an amount of retracting the scale holding plate 40 is sufficiently ensured. Therefore, a stable biasing force can be given even when the film scale 35 is expanded or contracted.

Figure 23:
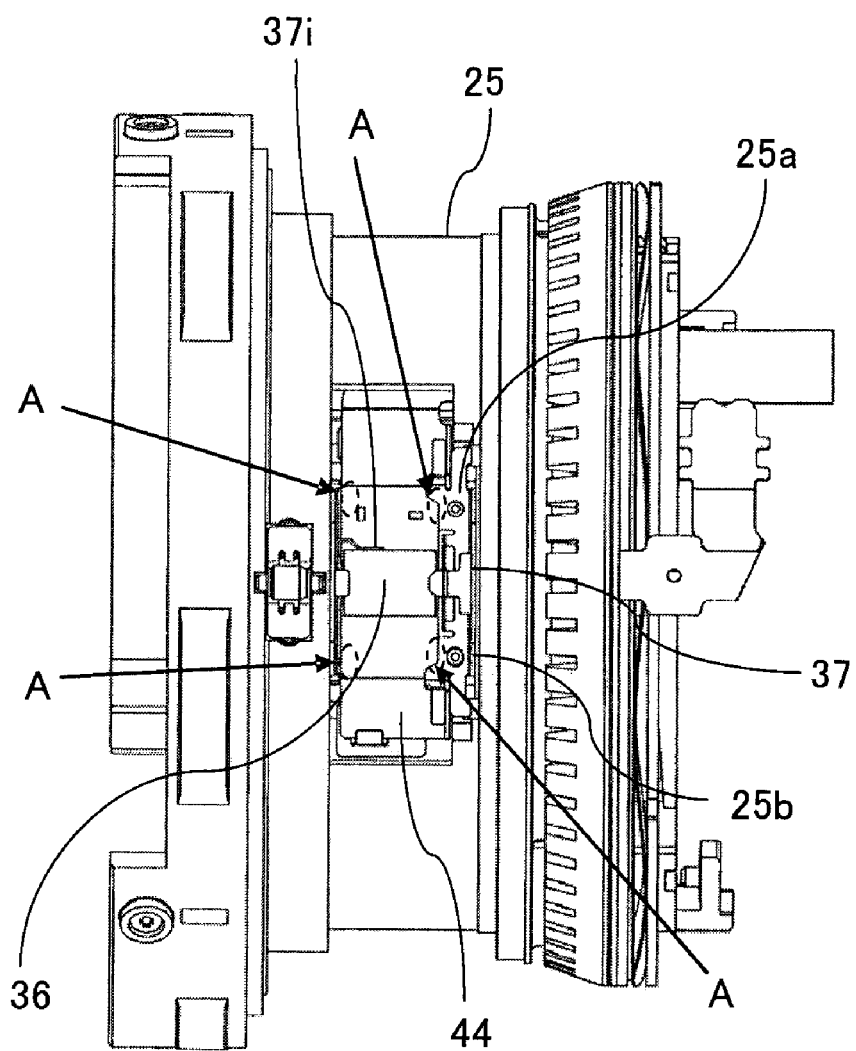
FIG. 23 is a diagram of describing a sensor head unit in the present embodiment.

Next, referring to FIG. 23, a configuration of the sensor head 36 will be described. FIG. 23 is a diagram of describing the sensor head 36 and its peripheral structure (a sensor head unit). In FIG. 23, the slide ring 29, the manual interlocking ring 28, the drive ring unit, the USM interlocking ring 30, and the USM rotor 31 are omitted from the focus drive unit 24. Reference numeral 44 denotes a sensor flexible printed circuit board, and the sensor head 36 is mounted on the sensor flexible printed circuit board 44. The sensor head 36 and the sensor flexible printed circuit board 44 are held by a sensor holder 37, and thus the sensor head unit (a detector) that detects a position of the drive ring 26 is configured.

Figure 24A:
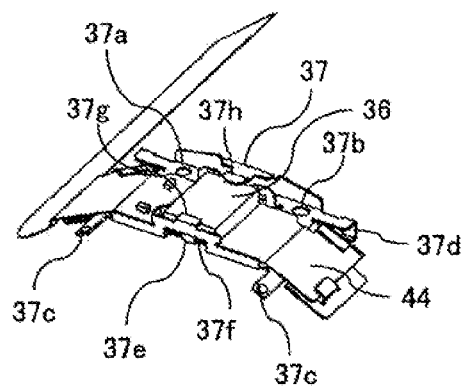
FIGS. 24A to 24D are perspective views of the sensor head unit in the present embodiment.

Subsequently, referring to FIGS. 1, 23, and 24A, a positioning of the sensor head 36 will be described. FIG. 24A is a perspective view of the sensor head unit. The sensor head 36 is positioned with respect to the sensor holder 37 and then the sensor head 36 is adhesively fixed on the sensor holder 37. It is preferred that the adhering position is set to be a position of an ellipsoidal dashed line indicated by an arrow A in FIG. 23. The sensor flexible printed circuit board 44 and the sensor holder 37 are adhesively fixed to each other, and thus the deterioration of the output caused by the adhesive invading the sensor head 36 that is an optical element can be prevented. A plan position of the sensor holder 37 is determined by fitting positioning pins 25a and 25b of the drive base 25 into a positioning hole 37a and an elongate hole 37b, respectively. The sensor holder 37 is fixed by clutching an attachment portion (not shown) of the drive base 25 by using two biasing arms 37c and two pulling arms 37d.

The positioning between the sensor head 36 and the sensor holder 37 is performed by the following method. In other words, with respect to the optical axis direction, the sensor head 36 is biased by a spring 37f provided on the sensor holder 37 at an optical axis reference wall 37e of the sensor holder 37. A gap direction of the sensor head 36 with respect to the film scale 35 is determined by gap reference walls 37g and 37h of the sensor holder 37. A biasing portion will be described below. Furthermore, the sensor head 36 contacts (abuts against) a reference wall 37i so as to determine the position of the sensor head 36 in a detecting direction.

Figure 24B:
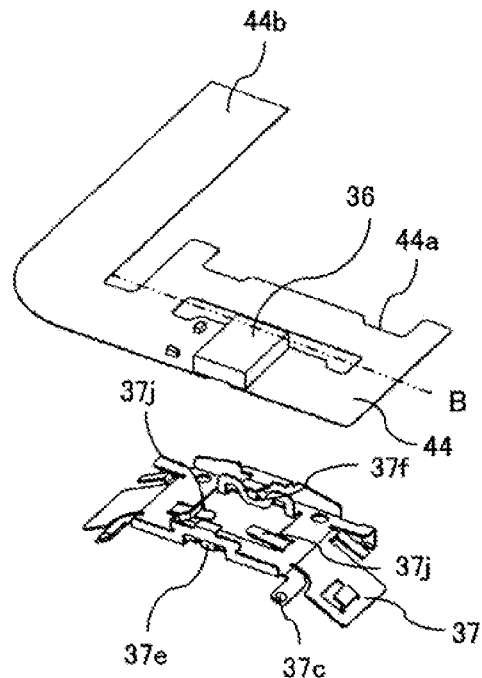
Figure 24C:
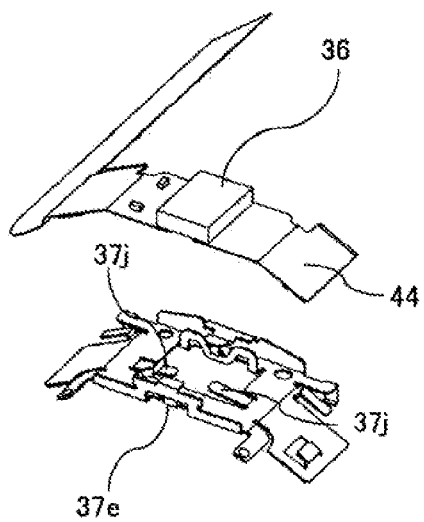
Figure 24D:
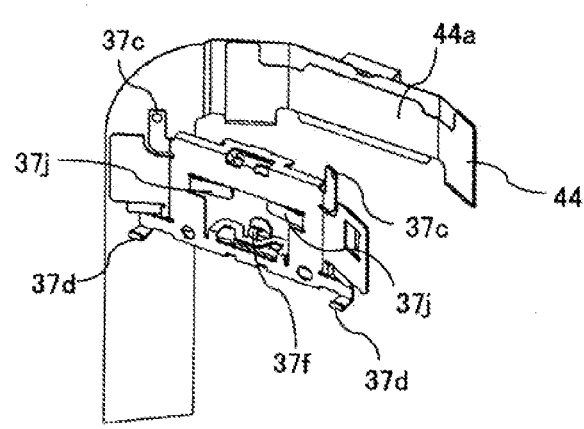

Next, a configuration of the sensor flexible printed circuit board 44 will be described. FIGS. 24B, 24C, and 24D are perspective views of a state before the sensor flexible printed circuit board 44 on which the sensor head 36 is mounted is fixed to the sensor holder 37. FIG. 24B illustrates the sensor flexible printed circuit board 44 which is in a developed state. The sensor head 36 is provided with a connection terminal (not shown) on both ends in the detecting direction, and a wire in front bypasses a portion 44a so as to be pulled to a portion 44b. The sensor flexible printed circuit board 44 is folded along a dashed-two dotted line B. FIGS. 24C and 24D illustrate the sensor flexible printed circuit board 44 in a folded state. Reference numeral 37j denotes a biasing spring that is integrally provided on the sensor holder 37. Unitization is performed so as to be in the state of FIG. 24A, and thus a folded portion (the portion 44a) of the sensor flexible printed circuit board 44 is held between its sides so as to perform the positioning of the sensor head 36 on the gap reference walls 37g and 37h.

Figure 25:
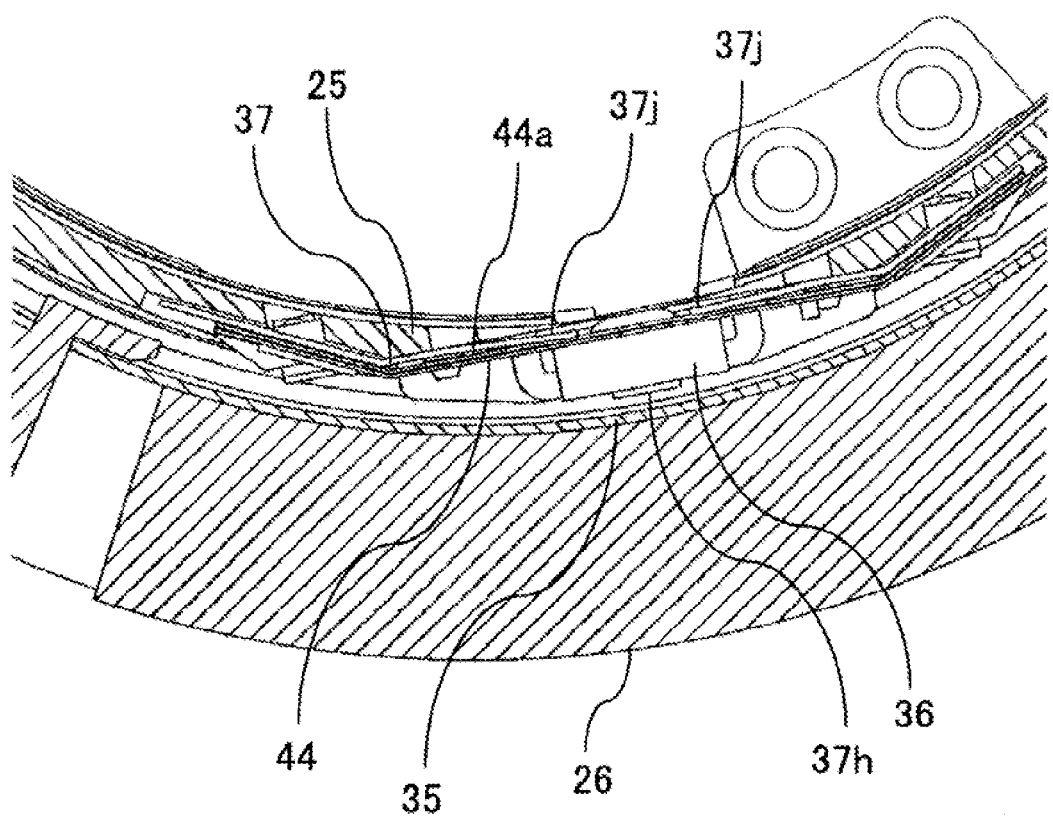
FIG. 25 is a cross-sectional view of a peripheral structure of the sensor head unit in the present embodiment.

FIG. 25 is a cross-sectional view of a peripheral structure of the sensor head unit in the present embodiment. The cross section indicated in FIG. 25 corresponds to the cross section indicated by the line A-A in FIG. 16, which illustrates a position relation of the configuration including the drive base 25, the drive ring 26, and the sensor head 36. The folded portion 44a of the sensor flexible printed circuit board 44 is disposed between two portions of the sensor flexible printed circuit board 44 mounting the sensor head 36 by using the biasing spring 37j of the sensor holder 37. A gap (a distance) between the sensor head 36 and the film scale 35 is kept with high accuracy by pressing the sensor head 36 with respect to a gap reference wall 37h (37g) of the sensor holder 37 by using the biasing spring 37j. Therefore, according to the configuration of the present embodiment, position detection can be performed with higher accuracy and higher resolution.

Figure 26A:
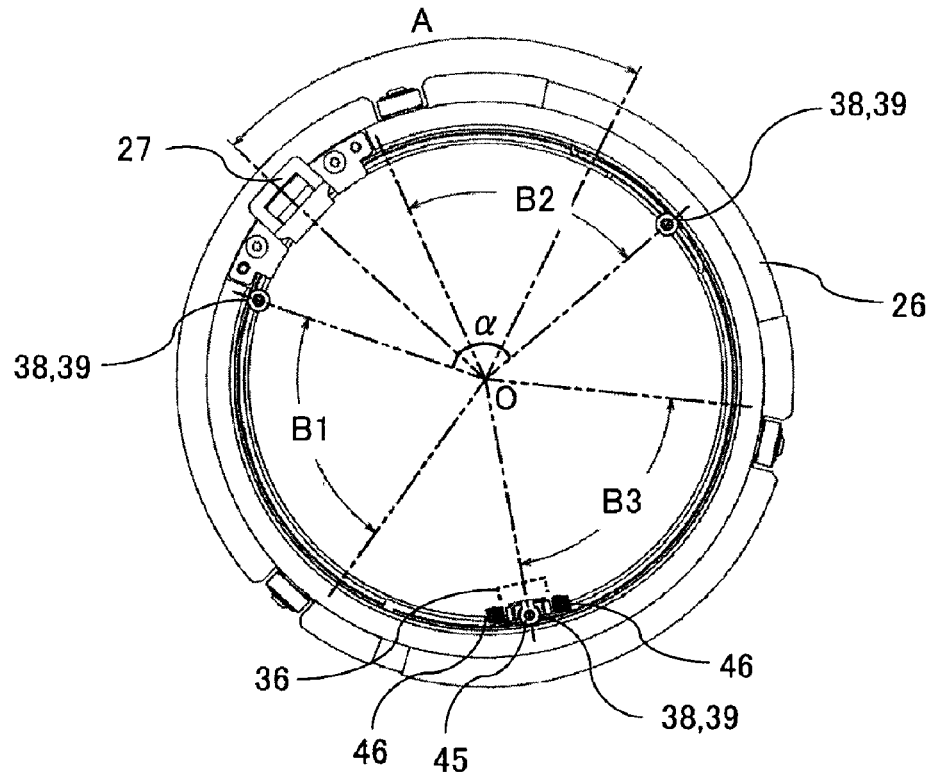
FIGS. 26A and 26B are back views of a peripheral structure of the drive ring unit in the present embodiment.
Figure 26B:
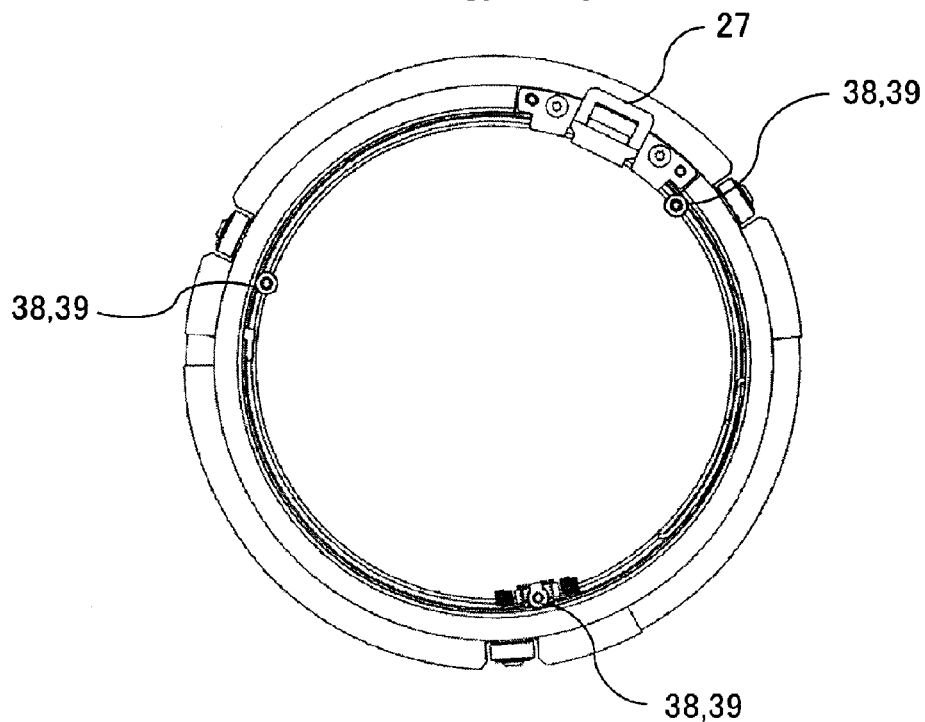

Next, referring to FIGS. 26A and 26B, a position relation of the three pairs of the guide rollers 38 and rotating shafts 39 and the connection key 27 will be described in details. FIGS. 26A and 26B are back views of a peripheral structure of the drive ring unit in the present embodiment, and FIG. 26A illustrates a state of an infinity position and FIG. 26B illustrates a state of a closest position. The three pairs of the guide rollers 38 and the rotating shafts 39 constitute three supporting portions that rotatably support the drive ring 26 with respect to the drive base 25, which are disposed at an angle α equivalent to each other with respect to the drive base 25. The angle α equivalent to each other means that an angle evaluated as an angle substantially equal to each other (an angle nearly equal to each other), as well as an angle exactly equal to each other (120 degrees). For two of the three pairs of the guide rollers 38 and the rotating shafts 39 at the upper side, the rotating shafts 39 are fixed on the drive base 25 (not shown). On the other hand, for the one at the lower side, the rotating shaft 39 is biased outwardly in a radial direction with respect to the drive base 25, and thus the drive ring 26 can be rotated at a constant position without a backlash. Reference numeral 45 denotes a guide roller holder, and reference numeral 46 denotes a compression coil spring.

Figure 27A:
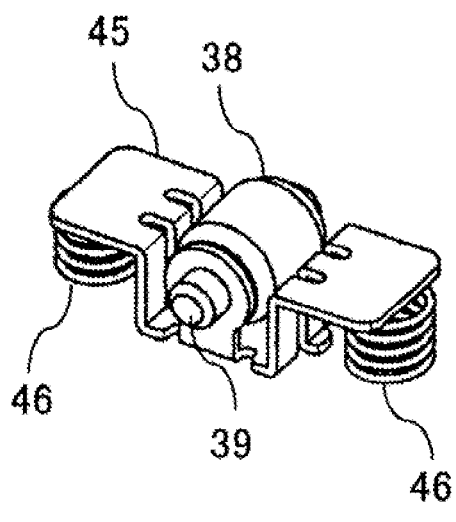
FIGS. 27A and 27B are perspective views of a guide roller in the present embodiment.
Figure 27B:
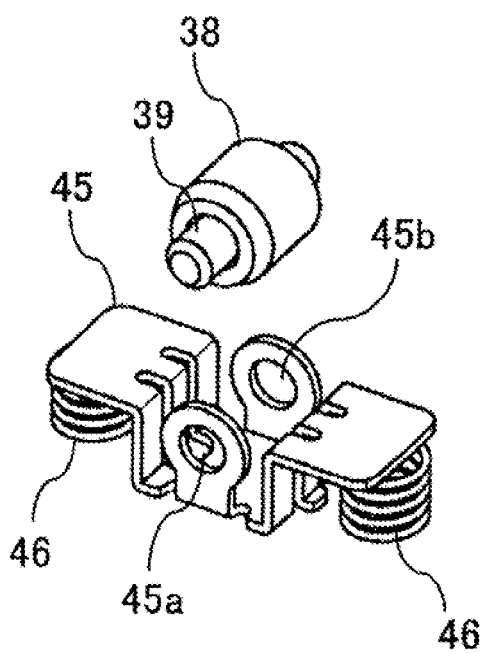

Subsequently, referring to FIGS. 27A and 27B, the configuration of the biased guide roller 38 (one supporting portion at the lower side) will be described. FIGS. 27A and 27B are perspective views of the guide roller 38 (the one pair of the guide roller 38 and the rotating shaft 39), and FIG. 27A illustrates an assembled diagram and FIG. 27B illustrates an exploded diagram. The guide roller holder 45 holds the rotating shaft 39 by inserting the rotating shaft 39 into hole portions 45a and 45b. The two compression coil springs 46 biases the guide roller 38 from a side of the drive base to a side of the drive ring 26. Thus, in the present embodiment, at least one of the supporting portions includes the guide roller 38 (a rotating portion) that rotates with respect to the drive base 25 and the compression coil spring 46 (a biasing portion) that biases the guide roller 38 in a direction of the drive base 25.

In FIG. 26A, an angle A is a rotatable range of the connection key 27. FIG. 26B illustrates a closest position which is rotated from the infinite position of FIG. 26A by the angle A (a first range). Thus, the connection key 27 rotates within phases (the angle A, the first range) between the two guide rollers 38 (the two supporting portions) of the three supporting portions. In FIG. 26A, each of angles B1, B2, and B3 is equal to the angle A, which indicates a range of the inner wall where each of the three guide rollers 38 limits a constant position rotation of the drive ring 26.

In the present embodiment, the sensor head 36 is arranged so as to be the same phase as that of the one pair of guide roller 38 at the lower side (one supporting portion at the lower side), i.e. at an angle corresponding to the one pair of guide roller 38. Therefore, the angle B3 has the same range as a detection range (a second range) of the film scale 35 and the sensor head 36 (a detector). Thus, the sensor head 36 (the film scale 35) is arranged at the angle B3 (the second range) that is different from the angle A (the first range). It is preferred that a first position within the first range and a second position within the second range are symmetric to each other with respect to a center O of the drive ring 26. For example, as illustrated in FIG. 26A, a position (the first position) of the connection key 27 that is rotatable at the angle A (within the first range) and a position (the second position) of the sensor head 36 at the angle B3 (within the second range) are configured so as to have a position relation opposed to (facing) each other. The guide roller 38 at the lower side and the sensor head 36 are not limited to the configuration in which they are arranged at the phase identical to each other, but also they may have a configuration in which they are arranged at phases close to each other.

According to this configuration, the connection key 27 and the film scale 35 (the sensor head 36) can be arranged so as to be overlapped with each other (on an identical plane), and therefore a space can be saved. In the present embodiment, the three supporting portions that rotatably support the drive ring 26 are provide, but the embodiment is not limited to this and four or more supporting portions may also be provided.

Figure 28A:
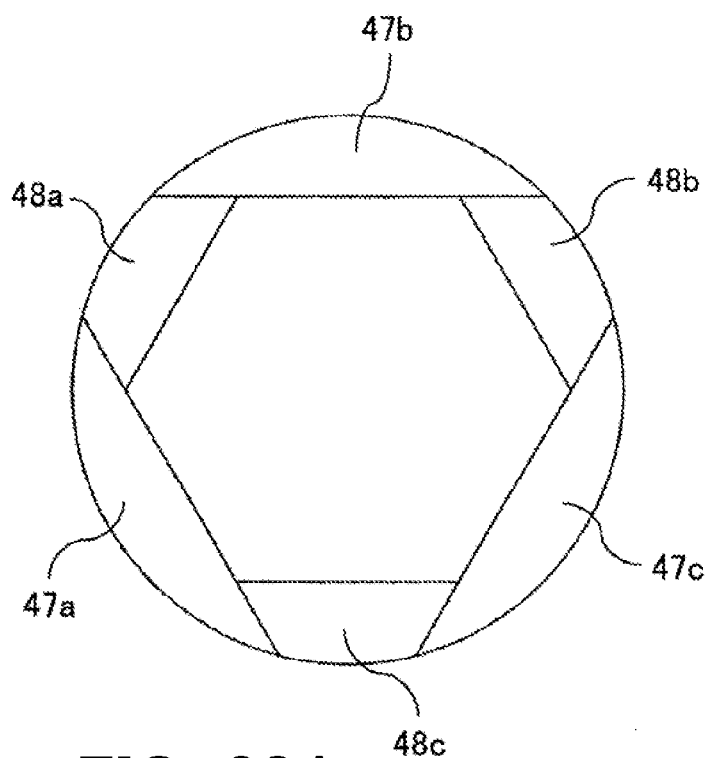
FIGS. 28A and 28B are diagrams of describing a slide mold for an inside diameter that is used for molding the drive ring in the present embodiment.
Figure 28B:
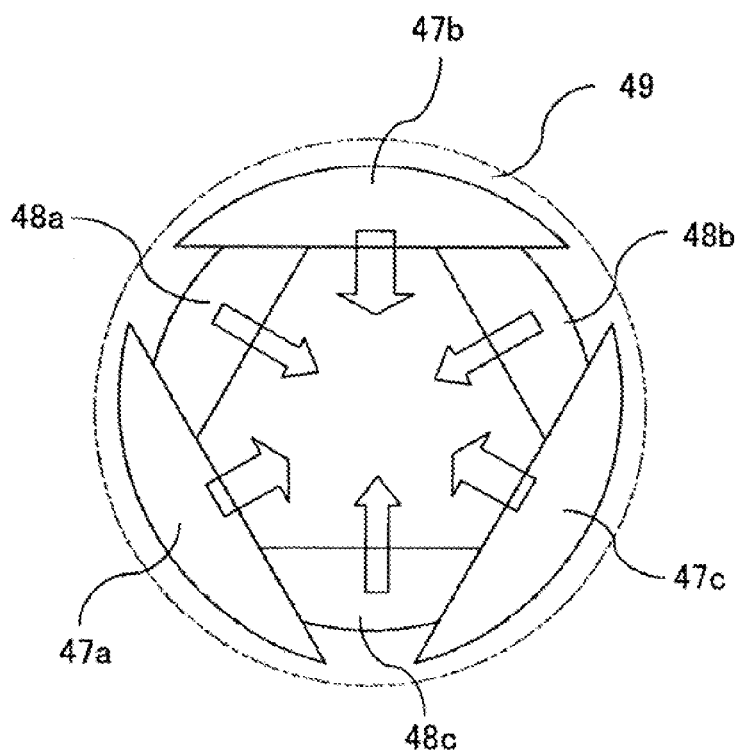

Next, referring to FIGS. 28A and 28B, a slide mold for an inside diameter that is used for molding the drive ring 26 will be described. The drive ring 26 of the present embodiment is an injection-molded product made of a thermoplastic resin, and its inside-diameter portion (the inner wall) is formed by using a well-known slide mold for the inside diameter. FIGS. 28A and 28B are configuration diagrams of six-direction slide mold for the inside diameter, and FIG. 28A illustrates a state at the time of the molding and FIG. 28B illustrates a state where the slide mold for the inside diameter is slid in a center direction (arrow directions) at the time of releasing the mold.

The six-direction slide mold for the inside diameter in the present embodiment is configured by including three large slide cores 47a, 47b, and 47c, and three small slide cores 48a, 48b, and 48c, and the drive ring 26 that is an injection-molded product is formed by these slide cores. An air gap 49 illustrated in FIG. 28B is a space that is formed by an outer circumference of each slide core at the molding indicated by a dashed-two dotted line and an outer circumference of each slide core slid in the arrow directions. The air gap 49 is a region where a convex shape of the molded product corresponding to a concave shape provided on each slide core is formed.

In such injection-molded products, a convex burr is generated in the inside-diameter direction at a portion corresponding to a boundary of each slide core. In the present embodiment, the inner walls having the angles B1, B2, and B3 illustrated in FIG. 26A of the drive ring 26 where the guide rollers 38 limit the constant position rotation are formed by the three large slide cores 47a, 47b, and 47c, respectively. In other words, each of regions where at least three supporting portions of the inner walls of the drive ring 26 limit the position of the drive ring 26 is formed by one slide core of the slide mold for the inside diameter. A portion corresponding to a detection range in the inner wall of the drive ring 26 where the film scale 35 is fixed is formed by the large slide core 47c. In other words, a surface within a detection range of the film scale 35 of the inner wall of the drive ring 26 is formed by one slide core of the slide mold for the inside diameter. According such configurations, a convex burr that is generated in an inside-diameter direction of a portion corresponding to the boundary of each slide core is not generated on the inner wall that limits the guide roller 38 or in the detection range of the film scale 35. Therefore, position detection can be performed with high accuracy and high resolution.

According to the present embodiment, an encoder, a lens apparatus, and a camera capable of performing position detection with high accuracy and high resolution and also improving a space efficiency can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-176385, filed on Aug. 8, 2012, which is hereby incorporated by reference herein in its entirety.

What is claimed is:

1. An encoder comprising:
    a base;
    a cylinder rotatable in a circumferential direction with respect to the base;
    at least three supporting portions provided on the base and rotatably supporting the cylinder;
    a connecting portion provided on the cylinder and connected to a drive mechanism of a lens unit;
    a scale; and
    a detector configured to detect a position of the cylinder with respect to the base by using the scale,
    wherein the connecting portion is rotatable within a first range between two supporting portions, of the at least three supporting portions, next to each other, and
    wherein the detector is arranged within a second range different from the first range.

2. The encoder according to claim 1, wherein a position of the connecting portion and a position of the detector are symmetric to each other with respect to a center of the cylinder.

3. The encoder according to claim 1, wherein at least one of the supporting portions includes a rotating portion that rotates with respect to the base and a biasing portion that biases the rotating portion in a direction of the base.

4. The encoder according to claim 1,
    wherein the cylinder is an injection-molded product having an inner wall of the cylinder that is formed by using a slide mold for an inside diameter, and
    wherein each of regions of the inner wall of the cylinder where the at least three supporting portions limit a position of the cylinder is formed by one slide core of the slide mold for the inside diameter.

5. The encoder according to claim 4, wherein a surface of the inner wall of the cylinder within a detection range of the scale is formed by one slide core of the slide mold for the inside diameter.

6. The encoder according to claim 1,
    wherein the cylinder includes:
    a fixed holder holding the scale;
    a scale holder configured to be movable in the circumferential direction of the cylinder and holding the scale; and
    a scale biasing portion configured to bias the scale via the scale holder toward a side of the fixed holder so that the scale is attached to an inner wall of the cylinder.

7. A lens apparatus comprising:
    a lens movable in an optical axis direction;
    a cylinder rotatable in a circumferential direction with respect to a base so as to move the lens in an optical axis direction;
    at least three supporting portions provided on a base and rotatably supporting the cylinder;
    a connecting portion provided on the cylinder and connected to a drive mechanism of a lens unit;
    a scale; and
    a detector configured to detect a position of the cylinder with respect to the base by using the scale,
    wherein the connecting portion is rotatable within a first range between two supporting portions, of the at least three supporting portions, next to each other, and
    wherein the detector is arranged within a second range different from the first range.

8. A camera comprising:
    a lens movable in an optical axis direction;
    an image pickup element configured to perform a photoelectric conversion of an object image from the lens;
    a cylinder rotatable in a circumferential direction with respect to a base so as to move the lens in the optical axis direction;
    at least three supporting portions provided on the base and rotatably supporting the cylinder;
    a connecting portion provided on the cylinder and connected to a drive mechanism of a lens unit;
    a scale; and
    a detector configured to detect a position of the cylinder with respect to the base by using the scale,
    wherein the connecting portion is rotatable within a first range between two supporting portions, of the at least three supporting portions, next to each other, and
    wherein the detector is arranged within a second range different from the first range.

* * * * *